Nov. 22, 1927. 1,649,891

A. M. COONS

VANITY CASE

Filed Jan. 15, 1925

Inventor
Arthur M Coons
By his Attorneys

Patented Nov. 22, 1927.

1,649,891

UNITED STATES PATENT OFFICE.

ARTHUR M. COONS, OF WATERBURY, CONNECTICUT, ASSIGNOR TO SCOVILL MANUFACTURING COMPANY, OF WATERBURY, CONNECTICUT, A CORPORATION OF CONNECTICUT.

VANITY CASE.

Application filed January 15, 1925. Serial No. 2,478.

This invention relates to the small boxes now largely used for carrying toilet articles, cigarettes and the like, and commonly known as vanity cases.

These cases are usually provided with a mirror or other reflecting surface, and the present invention has for its special object an improved construction for securing the mirror in place in these boxes, by which the mirror may be snapped into position without the use of bezels or other securing means which engage the surface of the mirror so that the whole reflecting surface may be utilized for reflecting purposes. With this and other objects not specifically referred to, the invention consists in certain novel parts, arrangements and combinations which will be described in connection with the accompanying drawings and the novel features pointed out in the claim hereunto annexed.

In the drawings:—

Referring now to these drawings, the invention has been shown as embodied in a two-part box, that is, a box having a body and a cover. However, it will be understood that the invention may be used in other types of boxes. In the box shown, there is provided a cover 1 and a bottom 2 pivotally associated on a hinge 3, these parts being secured together by a catch indicated at 4.

One of the parts of the box will carry a mirror or like reflecting surface and in the particular construction illustrated, the cover carries the mirror. In boxes embodying the invention the mirror carrying part will be slightly concave, as shown in Figure 1, this construction being adapted to afford room for the mirror securing means hereinafter referred to.

Figure 5:
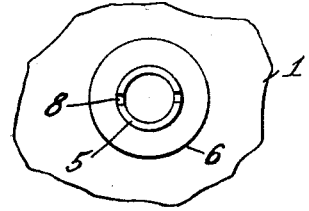
Figure 5 is a plan view of the structure shown in Figure 3.
Figure 6:
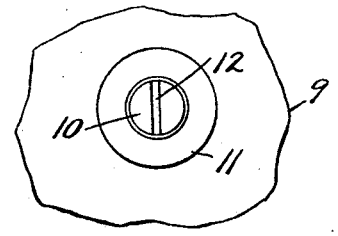
Figure 6 is a plan view of the part shown in Figure 4.

In accordance with the invention, means are provided whereby the mirror may be associated with the box by simply snapping the mirror in place, the mirror and the box having cooperating securing devices which are located between the edges of the mirror so that there are no parts projecting over the reflecting surface of the mirror and the whole surface can thereby be used for reflecting purposes and, furthermore, the mirror may be very readily and cheaply associated with the box. To effect this the box and mirror are provided with cooperating members, these members being of such character that they may be united with a snap or spring movement and the parts associated by simply pushing them together. While the particular construction for effecting this may be somewhat varied, in the particular construction illustrated the cover is provided with a socket member 5 having a flange 6 by which it may be secured in the box either by solder or welding, or other desired manner. This socket is made of light metal and the side walls are preferably slit, as indicated at 8 in Figure 5, so that they will be resilient and will yield to receive the cooperating member of the fastener and act to frictionally hold such member after it has been snapped into position. The reflecting surface may be of any desired character, a polished metal plate 9 having been shown. This plate 9 has secured thereon, as by welding or in any other suitable manner, a resilient head member 10 having a flange 11 by which it may be secured to the rear side of the mirror, the member being secured preferably about centrally of the mirror. This resilient head member 10 is preferably slit, as indicated at 12 in Figure 6, so as to provide the desired resiliency to render it easily placed in the socket 5.

Figure 1:
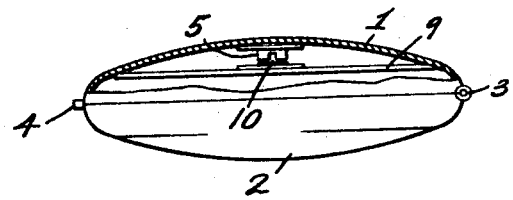
Figure 1 is a side view partly in section, of the improved mirror holding device.
Figure 2:
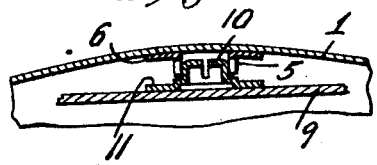
Figure 2 is a detail sectional view of part of the structure shown in Figure 1, on an enlarged scale.
Figure 3:
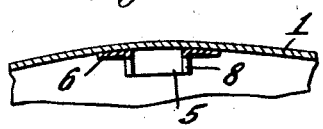
Figure 3 is a view similar to Figure 2, showing the socket member of the fastening.
Figure 4:
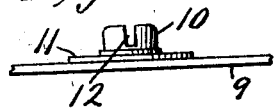
Figure 4 is a side view of the co-operating member of the fastening.

With this construction it will be seen that the mirror may be readily placed in position in the box without the use of holding bezels or rings, and the mirror will lie snugly against the surface of the box where the latter is concave, as shown in Figure 1. If the mirror is damaged or if it is desired to remove it for cleaning or any other purpose, this may be readily done by inserting a pin or other suitable tool beneath the edge of the mirror and prying it loose from its socket.

While the invention has been shown and described in its best form, it will be understood that certain changes and variations may be made in the specific form of the securing device and in the shape of the box, without departing from the invention as defined in the appended claim.

What is claimed is:

In a vanity case or the like, the combination with a body member, of a cover having a concave shape, a mirror so held in the cover as to expose its entire reflecting surface, means for detachably holding the mirror in the cover, said means comprising a socket member secured to the concave surface of the cover and a coacting resilient head member secured to the back of the mirror for engagement in the socket, said socket and head members being of such depth as to permit the periphery of the mirror to snugly engage the concave surface of the cover for more firmly supporting the mirror in position.

In testimony whereof, I have hereunto set my hand.

ARTHUR M. COONS.